(12) United States Patent
Frederiksen et al.

(10) Patent No.: US 9,320,034 B2
(45) Date of Patent: Apr. 19, 2016

(54) SYSTEMS, METHODS, APPARATUSES, AND COMPUTER PROGRAM PRODUCTS FOR COORDINATING COMMUNICATIONS BETWEEN NETWORK NODES

(75) Inventors: Frank Frederiksen, Klarup (DK); Tommi Koivisto, Espoo (FI); Klaus Ingemann Pedersen, Aalborg (DK); Vinh Van Phan, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 145 days.

(21) Appl. No.: 13/254,490

(22) PCT Filed: Mar. 5, 2009

(86) PCT No.: PCT/IB2009/050908
§ 371 (c)(1),
(2), (4) Date: Sep. 2, 2011

(87) PCT Pub. No.: WO2010/100526
PCT Pub. Date: Sep. 10, 2010

(65) Prior Publication Data
US 2011/0317611 A1    Dec. 29, 2011

(51) Int. Cl.
*H04W 72/04*    (2009.01)
*H04W 84/04*    (2009.01)
(Continued)

(52) U.S. Cl.
CPC ......... *H04W 72/0426* (2013.01); *H04L 5/0032* (2013.01); *H04W 36/0061* (2013.01); *H04W 84/047* (2013.01)

(58) Field of Classification Search
None
See application file for complete search history.

(56) References Cited

U.S. PATENT DOCUMENTS

| 5,317,623 A * | 5/1994 | Sakamoto | H04B 7/022 455/436 |
| 6,385,174 B1 * | 5/2002 | Li | 370/252 |
| 2003/0206531 A1 | 11/2003 | Shpak | 370/320 |

(Continued)

FOREIGN PATENT DOCUMENTS

EP    0 479 255 A2    4/1991

OTHER PUBLICATIONS

R1-083733, 3GPP TSG RAN WG1 #54bis Meeting, "Algorithms and Results for Autonomous Component Carrier Selection for LTE-Advanced" Nokia Siemens Networks, Nokia, Prague, Czech Republic, Sep. 29-Oct. 3, 2008, 6 pgs.

(Continued)

*Primary Examiner* — Ayaz Sheikh
*Assistant Examiner* — Mariela Vidal Carpio
(74) *Attorney, Agent, or Firm* — Harrington & Smith

(57) ABSTRACT

A system method, apparatus, and computer program product are provided for coordinating communications between network nodes. A method may include transmitting an information message related to a first network node implementing broadcasting-and-extracting mode to a neighboring network node implementing collecting-and-broadcasting mode during a first time interval. The method may further include receiving a collective information message package from the neighboring network node during a second time interval. The collective information message package may include one or more information messages received by the neighboring network node during the first time interval and an information message related to the neighboring network node. Corresponding systems, computer program products, and apparatuses are also provided.

21 Claims, 6 Drawing Sheets

(51) Int. Cl.
*H04L 5/00* (2006.01)
*H04W 36/00* (2009.01)

(56) References Cited

U.S. PATENT DOCUMENTS

| | | | |
|---|---|---|---|
| 2005/0030914 A1* | 2/2005 | Binzel et al. | 370/312 |
| 2006/0171332 A1* | 8/2006 | Barnum | H04W 8/005 370/254 |
| 2008/0171552 A1* | 7/2008 | Hyon | H04W 72/0406 455/450 |
| 2008/0181130 A1* | 7/2008 | Balu et al. | 370/254 |
| 2008/0212605 A1* | 9/2008 | Jiang | H04L 1/1685 370/449 |
| 2010/0091760 A1* | 4/2010 | Yoon | G04G 5/002 370/350 |
| 2010/0111048 A1* | 5/2010 | Shim et al. | 370/336 |
| 2010/0128701 A1* | 5/2010 | Nagaraja | 370/338 |
| 2010/0149983 A1* | 6/2010 | Lee | H04L 12/189 370/235 |
| 2010/0191968 A1* | 7/2010 | Patil et al. | 713/170 |
| 2010/0226308 A1* | 9/2010 | Haverty | 370/328 |

OTHER PUBLICATIONS

R1-090737, 3GPP TSG RAN WG1 #56 Meeting, "Inter eNB Over-the-Air Communication (OTAC) for LTE-Advanced", Nokia Siemens Networks, Nokia, Athens, Greece, Feb. 9-13, 2009, 6 pgs.

* cited by examiner

US 9,320,034 B2

SYSTEMS, METHODS, APPARATUSES, AND COMPUTER PROGRAM PRODUCTS FOR COORDINATING COMMUNICATIONS BETWEEN NETWORK NODES

TECHNOLOGICAL FIELD

Embodiments of the present invention relate generally to communication technology and, more particularly, relate to systems, methods, apparatuses, and computer program products for coordinating communications between network nodes.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. In order to provide easier or faster information transfer and convenience, telecommunication industry service providers are developing improvements to existing networks. For example, the evolved universal mobile telecommunications system (UMTS) terrestrial radio access network (E-UTRAN) is currently being developed. The E-UTRAN, which is also known as Long Term Evolution (LTE), is aimed at upgrading prior technologies by improving efficiency, lowering costs, improving services, making use of new spectrum opportunities, and providing better integration with other open standards. Standards are currently being defined for release 10 and beyond of LTE, which are also referred to as LTE-Advanced (LTE-A)

LTE provides for the network nodes which provide wireless network access to computing devices to communicate with each other over-the-air, also referred to as over-the-air communications (OTAC). These network nodes are referred to as evolved Node Bs (eNBs) in LTE. OTAC may be used to support flexible spectrum use (FSU) and self-organizing network (SON) features. In this regard, OTAC may support plug-and-play addition of a new network access point, such as a Home eNB (HNB) or local-area eNB (LNB) to a network.

One of the major challenges for OTAC in LTE is coordination of transmissions/receptions of OTAC messages among eNBs which are within the same local area cluster or neighborhood. In this regard, an eNB is only able to receive an OTAC message from another eNB if it is not transmitting an OTAC message at the same time. However, an eNB may be able to receive multiple OTAC messages from different eNBs at the same time if the respective OTAC messages are sent on separate channels such as on different component carriers or on orthogonal resources. Therefore, without coordination of communications between eNBs, contention between OTAC messages may result. For example, without coordination of communications, a first eNB may send an OTAC message to a second eNB at the same time as the second eNB is transmitting an OTAC message. The second eNB may fail to receive the OTAC message sent by the first eNB because of contention between the OTAC messages.

Accordingly, it may be advantageous to provide systems, methods, apparatuses, and computer program products for coordinating communications between network nodes.

BRIEF SUMMARY OF SOME EXAMPLES OF THE INVENTION

A system, method, apparatus, and computer program product are therefore provided for coordinating communications between network nodes. In this regard, a method, apparatus, and computer program product are provided that may provide several advantages to computing devices and network service providers. Embodiments of the invention define a protocol defining when a network node is allowed to send OTAC messages and when a network node must be in discontinued transmission (DTX) so that it may receive an incoming OTAC message. Accordingly, embodiments of the invention provide for contention-free transmission and receipt of information messages by network nodes within a neighborhood such that a network node may learn the state of its neighboring network nodes.

In a first exemplary embodiment, a method is provided, which includes implementing, at a first network node, broadcasting-and-extracting mode or collecting-and-broadcasting mode. Implementing broadcasting-and-extracting mode according to the method of this embodiment comprises transmitting an information message related to the first network node to a neighboring network node implementing collecting-and-broadcasting mode during a first time interval. Implementing broadcasting-and-extracting mode according to the method of this embodiment further comprises receiving a collective information message package from the neighboring network node during a second time interval. The collective information message package may include one or more information messages received by the neighboring network node during the first time interval and an information message related to the neighboring network node. Implementing collecting-and-broadcasting mode according to the method of this embodiment comprises receiving an information message from at least one neighboring network node implementing broadcasting-and-extracting mode during the first time interval. Implementing collecting-and-broadcasting mode according to the method of this embodiment further comprises generating a collective information message package comprising one or more received information messages and an information message related to the first network node. Implementing collecting-and-broadcasting mode according to the method of this embodiment additionally comprises transmitting the collective information message package to at least one neighboring network node implementing broadcasting-and-extracting mode during the second time interval.

In another exemplary embodiment, a computer program product is provided. The computer program product includes at least one computer-readable storage medium having computer-readable program instructions stored therein. The computer-readable program instructions may include a plurality of program instructions. Although in this summary, the program instructions are ordered, it will be appreciated that this summary is provided merely for purposes of example and the ordering is merely to facilitate summarizing the computer program product. The example ordering in no way limits the implementation of the associated computer program instructions. The first program instruction of this embodiment is configured for implementing, at a first network node, at least one of broadcasting-and-extracting mode or collecting-and-broadcasting mode. When implementing broadcasting-and-extracting mode, the first program instruction of this embodiment comprises instructions configured for causing an information message related to the first network node to be transmitted to a neighboring network node implementing collecting-and-broadcasting mode during a first time interval. When implementing broadcasting-and-extracting mode, the first program instruction of this embodiment further comprises instructions for causing a collective information message package to be received from the neighboring network node during a second time interval. The collective information message package may include one or more information messages received by the neighboring network node during the first time interval and an information message related to the neighboring network node. When implementing collecting-and-broadcasting mode, the first program instruction of this embodiment comprises instructions configured for causing an information message to be received from at least one neighboring network node implementing broadcasting-and-extracting mode during the first time interval. When implementing collecting-and-broadcasting mode, the first program instruction of this embodiment further comprises instructions for generating a collective information message package comprising one or more received information messages and an information message related to the first network node. When implementing collecting-and-broadcasting mode, the first program instruction of this embodiment additionally comprises instructions for causing the collective information message package to be transmitted to at least one neighboring network node implementing broadcasting-and-extracting mode during the second time interval.

In another exemplary embodiment, an apparatus is provided. The apparatus of this embodiment includes a processor and a memory that stores instructions that when executed by the processor cause the apparatus to implement at least one of broadcasting-and-extracting mode or collecting-and-broadcasting mode. When implementing broadcasting-and-extracting mode, the instructions of this embodiment when executed by the processor cause the apparatus to transmit an information message related to the apparatus to a neighboring network node implementing collecting-and-broadcasting mode during a first time interval. When implementing broadcasting-and-extracting mode, the instructions of this embodiment when executed by the processor further cause the apparatus to receive a collective information message package from the neighboring network node during a second time interval. The collective information message package may include one or more information messages received by the neighboring network node during the first time interval and an information message related to the neighboring network node. When implementing collecting-and-broadcasting mode, the instructions of this embodiment when executed by the processor cause the apparatus to receive an information message from at least one neighboring network node implementing broadcasting-and-extracting mode during the first time interval. When implementing collecting-and-broadcasting mode, the instructions of this embodiment when executed by the processor further cause the apparatus to generate a collective information message package comprising one or more received information messages and an information message related to the apparatus. When implementing collecting-and-broadcasting mode, the instructions of this embodiment when executed by the processor additionally cause the apparatus to transmit the collective information message package to at least one neighboring network node implementing broadcasting-and-extracting mode during the second time interval.

In another exemplary embodiment, an apparatus is provided, which includes means for implementing at least one of broadcasting-and-extracting mode or collecting-and-broadcasting mode. When implementing broadcasting-and-extracting mode, the means of this embodiment comprises means for transmitting an information message related to the apparatus to a neighboring network node implementing collecting-and-broadcasting mode during a first time interval. When implementing broadcasting-and-extracting mode, the means of this embodiment further comprises means for receiving a collective information message package from the neighboring network node during a second time interval. The collective information message package may include one or more information messages received by the neighboring network node during the first time interval and an information message related to the neighboring network node. When implementing collecting-and-broadcasting mode, the means of this embodiment comprise means for receiving an information message from at least one neighboring network node implementing broadcasting-and-extracting mode during the first time interval. When implementing collecting-and-broadcasting mode, the means of this embodiment further comprise means for generating a collective information message package comprising one or more received information messages and an information message related to the apparatus. When implementing collecting-and-broadcasting mode, the means of this embodiment additionally comprise means for transmitting the collective information message package to at least one neighboring network node implementing broadcasting-and-extracting mode during the second time interval.

In another exemplary embodiment, a system is provided which comprises a first network node implementing collecting-and-broadcasting mode and one or more network nodes neighboring the first network node and implementing broadcasting-and-extracting mode. The first network node of this embodiment is configured to receive an information message from at least one of the one or more neighboring network nodes during a first time interval. The first network node of this embodiment is further configured to generate a collective information message package comprising the received information messages and an information message related to the first network node. The first network node of this embodiment is also configured to transmit the collective information message package to the one or more network nodes neighboring the first network node during a second time interval. The one or more network nodes neighboring the first network node of this embodiment are configured to transmit an information message to the first network node during the first time interval. The one or more network nodes neighboring the first network node of this embodiment are further configured to receive the collective information message package from the first network node during the second time interval.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Figure 1:
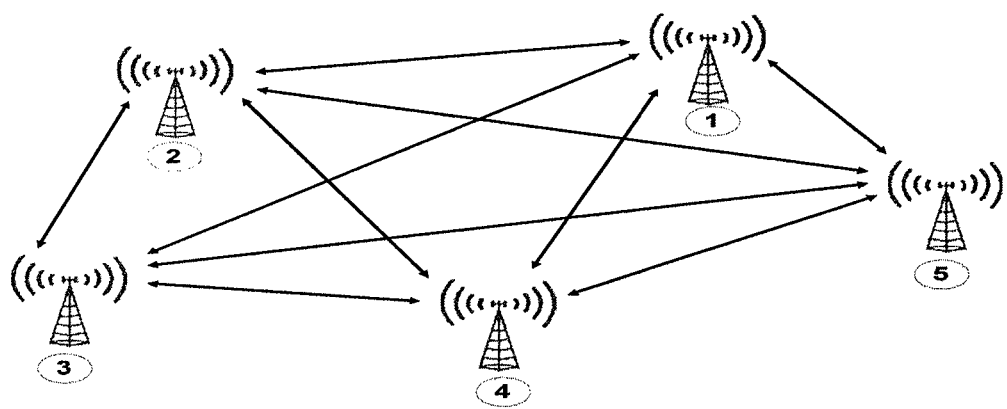
FIG. 1 illustrates a system comprising a plurality of network nodes engaged in over-the-air communications.

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a system comprising a plurality of network nodes (labeled 1-5) engaged in OTAC. A "network node" may comprise a network entity configured to provide wireless network access to computing devices, such as, for example, mobile terminals or user equipment (UE). In this regard, a network node may be configured, for example, to provide a mobile terminal with access to a cellular communications network. Accordingly, a network node may comprise, for example, an access point, base station (BS), an eNB, home eNB, serving general packet radio service support node (SGSN), base transceiver station (BTS), and/or the like.

A network node may be further configured to establish a connection to and exchange OTAC messages with a neighboring network node. A connection between network nodes used as an OTAC channel may be of broadcast or forward-access nature of which the mapping onto physical resources (e.g., onto frequency, time, code and/or space domains) is based on a deterministic rule across deployed network nodes in a local area, such as the system illustrated in FIG. 1. OTAC channels of neighboring network nodes according to some embodiments of the invention are orthogonal so as to allow for separating the OTAC signals from each actively transmitting network node at corresponding listening network node(s). Accordingly, for example, when network node 1 is silent, then it may receive parallel OTAC messages sent from network nodes 2, 3, 4, and 5 on different component carriers.

A network node may be configured to be of somewhat plug-and-play nature, such that upon, for example, insertion or reactivation into a certain network neighborhood, the network node may spend a sufficient amount of time (e.g., in the order of multiple radio frames) listening to broadcast channels and/or OTAC messages transmitted by neighboring network nodes to "sense" the surrounding radio environment, synchronize with other network nodes in the network neighborhood, and/or listen to the network neighborhood. This kind of OTAC, wherein a network node listens to OTAC messages transmitted by neighboring network node, for synchronization and/or configuration purposes is referred to as in-frequent, or long, OTAC. Long OTAC may facilitate carrying out the SON driven initial cell configuration or major cell reconfiguration, including cell synchronization and resynchronization.

Network nodes may also engage in frequent, or short, OTAC, which may be carried out in as little as a single subframe of a radio frame. Short OTAC may be used by network nodes for channel allocation, basic scheduling, on-the-run FSU related cell-configuration-update indication, spectrum-load-balancing indication, inter-cell interference coordination (ICIC), and/or the like.

Figure 2:
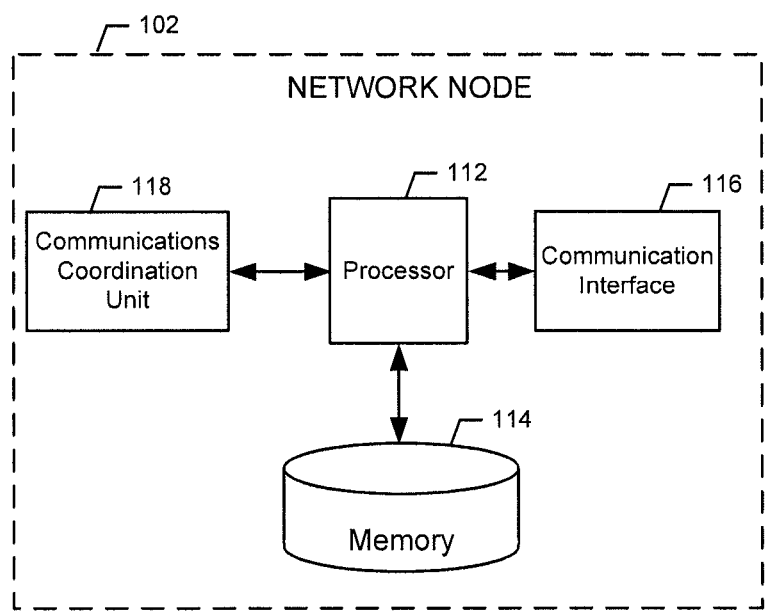
FIG. 2 illustrates a block diagram of a network node according to an exemplary embodiment of the present invention.

FIG. 2 illustrates a block diagram of a network node according to an exemplary embodiment of the present invention. As used herein, "exemplary" merely means an example and as such represents one example embodiment for the invention and should not be construed to narrow the scope or spirit of the invention in any way. It will be appreciated that the scope of the invention encompasses many potential embodiments in addition to those illustrated and described herein. As such, while FIG. 2 illustrates one example of a configuration of a network node, numerous other configurations may also be used to implement embodiments of the present invention.

In an exemplary embodiment, the network node 102 includes various means, such as a processor 112, memory 114, communication interface 116, and communications coordination unit 118 for performing the various functions herein described. These means of the network node 102 as described herein may be embodied as, for example, hardware elements (e.g., a suitably programmed processor, combinational logic circuit, and/or the like), a computer program product comprising computer-readable program instructions (e.g., software or firmware) stored on a computer-readable medium (e.g. memory 114) that is executable by a suitably configured processing device (e.g., the processor 112), or some combination thereof.

The processor 112 may, for example, be embodied as various means including one or more microprocessors with accompanying digital signal processor(s), one or more processor(s) without an accompanying digital signal processor, one or more coprocessors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 112 comprises a plurality of processors. The plurality of processors may be in operative communication with each other and may be collectively configured to perform one or more functionalities of the network node 102 as described herein. In an exemplary embodiment, the processor 112 is configured to execute instructions stored in the memory 114 or otherwise accessible to the processor 112.

The memory 114 may include, for example, volatile and/or non-volatile memory. Although illustrated in FIG. 2 as a single memory, the memory 114 may comprise a plurality of memories, which may include volatile memory, non-volatile memory, or some combination thereof. In this regard, the memory 114 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory 114 may be configured to store information, data, applications, instructions, or the like for enabling the network node 102 to carry out various functions in accordance with exemplary embodiments of the present invention. For example, in at least some embodiments, the memory 114 is configured to buffer input data for processing by the processor 112. Additionally or alternatively, in at least some embodiments, the memory 114 is configured to store program instructions for execution by the processor 112, which when executed by the processor 112 may cause the network node 102 to carry out one or more of the functionalities described herein. The memory 114 may store information in the form of static and/or dynamic information. This stored information may be stored and/or used by the communications coordination unit 118 during the course of performing its functionalities.

The communication interface 116 may be embodied as any device or means embodied in hardware, a computer program product comprising computer readable program instructions stored on a computer readable medium (e.g., the memory 114) and executed by a processing device (e.g., the processor 112), or a combination thereof that is configured to receive and/or transmit data from/to a remote device, such as another network node 102 over the communication link 110. In at least one embodiment, the communication interface 116 is at least partially embodied as or otherwise controlled by the processor 112. The communication interface 116 may include, for example, an antenna, a transmitter, a receiver, a transceiver and/or supporting hardware or software for enabling communications with other network nodes 102 and/or with computing devices accessing a network through the network node 102. The communication interface 116 may be configured to receive and/or transmit data using any protocol that may be used for communications between network nodes 102 and/or with other computing devices. In this regard, the communication interface 116 may be configured to receive OTAC messages from and/or transmit OTAC messages to another network node 102. The communication interface 116 may additionally be in communication with the memory 114 and/or communications coordination unit 118, such as via a bus.

The communications coordination unit 118 may be embodied as various means, such as hardware, a computer program product comprising computer readable program instructions stored on a computer readable medium (e.g., the memory 114) and executed by a processing device (e.g., the processor 112), or some combination thereof and, in one embodiment, is embodied as or otherwise controlled by the processor 112. In embodiments where the communications coordination unit 118 is embodied separately from the processor 112, the communications coordination unit 118 may be in communication with the processor 112. The communications coordination unit 118 may further be in communication with the memory 114 and/or communication interface 116, such as via a bus. According to embodiments of the invention, the communications coordination unit 118 is configured to implement either broadcasting-and-extracting mode (BEM) or collecting-and-broadcasting mode (CBM) at a network node 102, as described further herein.

Figure 3:
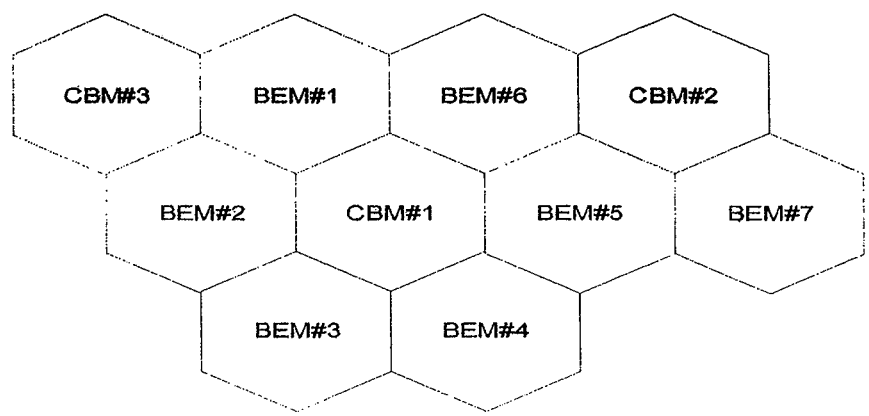
FIG. 3 illustrates a configuration for a system comprising a plurality of network nodes arranged for coordination of communications between the network nodes according to an embodiment of the present invention.

Implementation at a network node 102 of either BEM or CBM may adhere to the rule that there will be no two direct neighboring network nodes which are implementing CBM, as illustrated in FIG. 3. In this regard, direct neighboring network nodes may comprise network nodes that are within radio range of each other. In this regard, FIG. 3 illustrates a configuration for a system comprising a plurality of network nodes 102 arranged for coordination of communications between the network nodes according to an embodiment of the present invention. As illustrated in FIG. 3, none of the network nodes 102 implementing CBM (e.g., CBM#1, CBM#2, and CBM #3) directly neighbor each other. However, a network node 102 implementing BEM (e.g., BEM#6) may directly neighbor multiple network nodes 102 implementing CBM (e.g., CBM#1 and CBM#2). Although FIG. 3 illustrates a two-dimensional arrangement of network nodes 102, it will be appreciated that network nodes 102 may also be arranged in a three dimensional space, such as in a high-rise office building.

The initial configuration and possible reconfiguration of a network node 102 to implement either BEM or CBM may comprise a part of SON-based network node configuration and reconfiguration. In some embodiments, a network operator adding a network node to a network may configure the communications coordination unit 118 to implement BEM or to implement CBM. Additionally or alternatively, during long OTAC upon insertion and/or reactivation onto a network, the communications coordination unit 118 may be configured in some embodiments to determine (e.g., during long OTAC) whether neighboring network nodes 102 are implementing BEM or CBM and determine a mode to implement based at least in part upon what mode(s) neighboring network nodes 102 are implementing. In this regard, the communications coordination unit 118 of a first network node 102 may be configured to determine what mode a neighboring network node(s) 102 is implementing and determine a mode to implement at the first network node 102 based at least in part upon the determination. Accordingly, the communications coordination unit 118 of the first network node 102 may determine to implement CBM if it detects that no neighboring network nodes 102 are implementing CBM, but must implement BEM if the communications coordination unit 118 determines that any neighboring network node 102 is implementing CBM.

When implementing CBM, the communications coordination unit 118 is configured in some embodiments to discontinue any OTAC transmission and listen to neighboring network nodes 102 implementing BEM during a predefined time interval reserved for transmitting information messages from network nodes 102 implementing BEM ("BEM network nodes") to network nodes 102 implementing CBM ("CBM network nodes"). Such a time interval reserved for transmitting information messages from BEM network nodes to CBM network nodes may be referred to as a "BEM→CBM occasion". The predefined time interval may comprise, for example, one or more subframes of a radio frame. The communications coordination unit 118 may be configured to receive (e.g., via the communication interface 116) an information message (e.g., an OTAC message) from one or more BEM network nodes. A received information message may be related to the respective BEM network node which transmitted the information message and thus may comprise a record for the respective BEM network node, which may comprise, for example, information pertaining to a status of the respective BEM network node.

An information message received from a BEM network node may comprise the following format:

| Field | Size (bits) | Comment |
| --- | --- | --- |
| BEM eNB ID | 16 (0) | This can be explicit or implicit (0). The latter may be based on 1:1 mapping between eNB ID and its unique OTAC channel ID within the neighbourhood. The latter may also be in the case that ID-masking CRC is applied. |
| MsgType | 3 (0) | This can be explicit or implicit (0). The latter may be based on having message-type specific transmit-listen coordination pattern. |

-continued

| Field | Size (bits) | Comment |
|---|---|---|
| MsgContent | 13-16 | |
| CRC | 16 (0) | ID masking CRC if applied together with ID field |

The information message may comprise a BEM network node identity (ID) field (e.g., a BEM eNB ID field), which may indicate an identity of the BEM network node to which the information message is related. The identity may comprise a network node identity, a physical layer, or L1, Cell ID, an indication of an identity of the OTAC channel used by the BEM network node, and/or the like. It will be appreciated that the size in bits of the BEM network node ID field may vary depending on the type of identity indication used and in some embodiments, the information message may not comprise a BEM network node ID field. The information message may further comprise a message type (MsgType) field that may indicate a type of information included in the information message. The information message may additionally comprise a message content (MsgContent) field, which may comprise the actual information content of the information message. In some embodiments, the information message may comprise a cyclic redundancy check (CRC) field to enable a receiving network node to verify a received information message. The size in bits listed for the fields of the information message as well as the ordering of the fields described in the above example information message format represent an example embodiment of an information message and thus may vary in other embodiments.

The communications coordination unit 118 of a CBM network node may be configured to collect information messages received from neighboring BEM network nodes during one or more BEM→CBM occasions and may store the received information messages in the memory 114. The communications coordination unit 118 may be configured to discard a previously stored information message related to a BEM network node when a new information message is received from the BEM network node. Accordingly, the set of collected information messages may comprise only the most recently received information message for respective neighboring BEM network nodes. The communications coordination unit 118 of a CBM network node may be further configured to generate a collective information message package comprising the collected information messages. The collective information message package generated by the communications coordination unit 118 may further comprise an information message related to the CBM network node. Accordingly, a collective information message package generated by a CBM network node may include information messages (e.g., records) for BEM network nodes neighboring the CBM network node and for the CBM network node.

The generated collective information message package may comprise the following format:

| Field | Size (bits) | Comment |
|---|---|---|
| CBM eNB ID#1 | 16 (0) | This can be explicit or implicit (0). The latter may be based on 1:1 mapping between eNB ID and its unique OTAC channel ID within the neighbourhood. The latter may also be in the case that ID-masking CRC is applied. |
| MsgType | 3 (0) | This can be explicit or implicit (0). The latter may be based on having message-type specific transmit-listen coordination pattern. |
| MsgContent | 13-16 | |
| ExtensionFlag | 2 | To indicate whether further received record(s) of neighbouring BEM eNB(s) follow or not and if yes then whether the present CBM->BEM occasion has extension |
| CRC | 16 (0) | ID masking CRC if applied together with ID field |
| BEM eNB ID#1 | 16 (0) | This can be explicit or implicit (0). The latter may be based on 1:1 mapping between eNB ID and its unique OTAC channel ID within the neighbourhood. The latter may also be in the case that ID-masking CRC is applied. |
| MsgType | 3 (0) | This can be explicit or implicit (0). The latter may be based on having message-type specific transimit-listen coordination pattern. |
| MsgContent | 13-16 | |
| CRC | 16 (0) | ID masking CRC if applied together with ID field |
| . . . | | |
| BEM eNB ID#6 | 16 (0) | This can be explicit or implicit (0). The latter may be based on 1:1 mapping between eNB ID and its unique OTAC channel ID within the neighbourhood. The latter may also be in the case that ID-masking CRC is applied. |
| MsgType | 3 (0) | This can be explicit or implicit (0). The latter may be based on having message-type specific transmit-listen coordination pattern. |
| MsgContent | 13-16 | |
| CRC | 16 (0) | ID masking CRC if applied together with ID field |

In this example, the collective information message package comprises a collective information message package such as may be generated by the CBM#1 of FIG. 3. The collective information message package comprises information messages for each of BEM#1-BEM#6 as well as an information message related to CBM#1, which may comprise the first information message of the collective information message package. It will be appreciated that the size in bits listed for the fields of the collective information message package as well as the ordering of the fields merely represent an example embodiment of a collective information message package and thus may vary in other embodiments.

The collective information message package may include one or more additional fields, such as in a header of the collective information message package, which may facilitate decoding of individual information messages inside the package. For example, fields indicating length/position/order indications, extension bits, number of individual information messages included in the collective information message package, or the like may be included in the collective information message package.

The collective information message package may include one or more fields indicating control information to further facilitate error checking and/or to facilitate combining of multiple information messages and/or collective information message packages transmitted by CBM network nodes at a BEM network node, as a BEM network node may receive redundant information messages related to a particular network node 102 from different CBM network nodes. In FIG. 3, for example, BEM#2 may receive redundant information messages related to BEM#1 from CBM#1 and CBM#3. Accordingly, a collective information message package may comprise a field including, for example, an indication of the used redundancy version to support combining redundant information messages at a BEM network node. Such control information may further support implementation of hybrid automatic repeat request (HARQ)—like operations by BEM network nodes and CBM network nodes.

The collective information message package may comprise control information indicating time and/or frequency resources used to transmit collective information message packages, which may be used by a receiving BEM network node to combine redundant information messages.

The communications coordination unit 118 of a CBM network node may be configured to negotiate and/or otherwise coordinate with neighboring BEM network nodes what control information (e.g., redundancy version, radio resources, and/or the like) to use to facilitate combining redundant information messages at a receiving BEM network node.

The communications coordination unit 118 of a CBM network node may be further configured to transmit (e.g., via the communications interface 116) the collective information message package to neighboring BEM network nodes during a predefined time interval reserved for transmitting information messages from CBM network nodes to BEM network nodes. Such a time interval may be referred to as a "CBM→BEM occasion". The CBM→BEM occasion may be scheduled to occur a predefined number "k" subframes following a preceding BEM→CBM occasion.

The communications coordination unit 118 of a BEM network node is configured in some embodiments to transmit (e.g., via the communications interface 116) an information message to a neighboring CBM network node during a BEM→CBM occasion. The communications coordination unit 118 of the BEM network node may be further configured to receive a collective information message package from the neighboring CBM network node during a CBM→BEM occasion. The communications coordination unit 118 of a BEM network node may additionally be configured to extract the information messages comprising the received collective information message package from the collective information message package. In this regard, a BEM network node may receive information messages for its neighboring network nodes in the collective information message package.

Sometimes a resource (e.g., a time interval) required for a CBM network node to transmit a collective information message package may exceed the resource (e.g., the time interval) reserved for a CBM→BEM occasion. In this regard, for example, the size of the collective information message package may vary depending on the number of BEM network nodes in the direct neighborhood of a respective CBM network node and a specified resource allocation for a CBM→BEM occasion may be based, for example, on an a number of neighboring BEM network nodes that may reside in an average neighborhood of a CBM network node or some other specified criteria or tolerance level representing less than an actual number of neighboring BEM network nodes for a particular CBM network node. In such situations, some embodiments implement segmentation of collective information message packages when appropriate. In such embodiments, a first portion (e.g., a segment) of the collective information message package may be transmitted by the CBM network node during a scheduled CBM→BEM occasion. The first portion of the collective information message package may comprise an extension flag indicating that transmission of the collective information message package will be continued over a subsequent time interval. As illustrated in the above example format for a collective information message package, the extension flag field (ExtensionFlag) may be included, for example, in the information message related to the CBM network node transmitting the collective information message package or in a header for the collective information message package. The extension flag may further indicate when the subsequent time interval will occur, such as by defining a number "I" of subframes following the CBM→BEM occasion during which transmission of the collective information message package will be continued by transmission of a subsequent portion of the collective information message package. It will be appreciated that I may comprise any number of subframes, such that transmission of portions of the collective information message package may be continuous or may be interrupted by a delay of I intervening subframes. A BEM network node upon receiving a portion of a collective information message package comprising an extension flag may be configured to not transmit any OTAC messages during the subsequent time interval so that it may receive the subsequent portion(s) of the collective information message package. It will be appreciated that a collective information message package may be divided into any number of portions for transmission and each non-terminal portion of the collective information message package may comprise an extension flag indicating when the subsequent portion will be transmitted.

Figure 4:
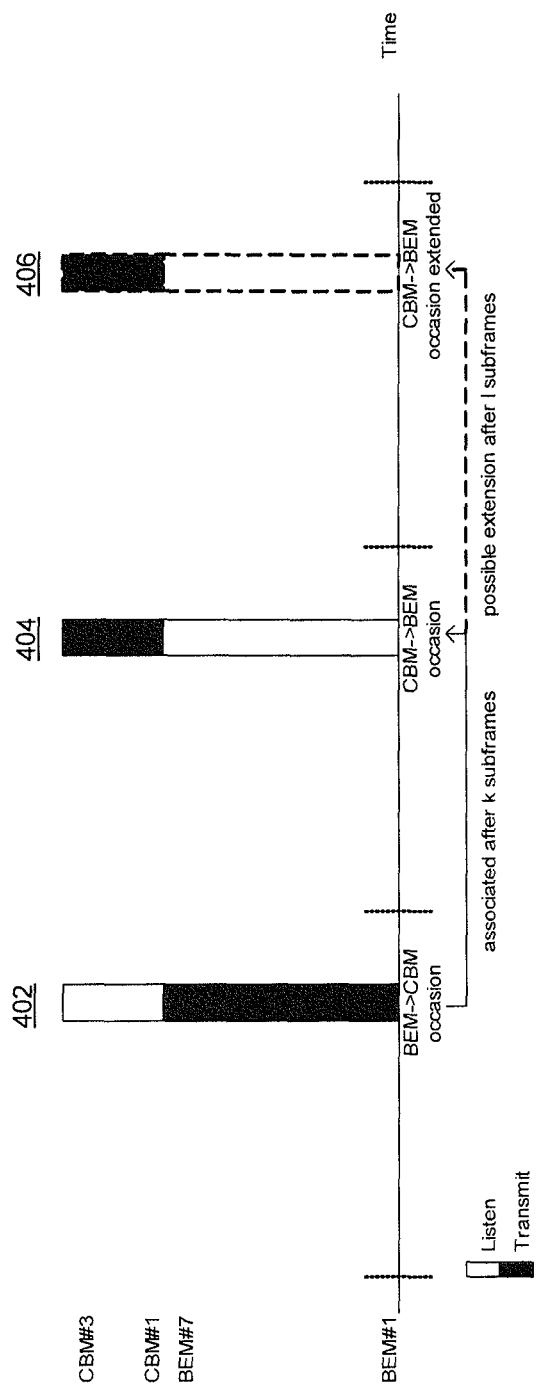
FIG. 4 is a graph illustrating the timing of communications between network nodes according to an exemplary embodiment of the present invention.

FIG. 4 is a graph illustrating the timing of communications between network nodes according to an exemplary embodiment of the present invention. In this regard, FIG. 4 illustrates the timing of communications that may be exchanged between network nodes of the system of FIG. 3. Darkly shaded portions of the bars of the graph indicate that a corresponding network node is transmitting an OTAC message, while lightly shaded portions of the bars of the graph indicate that a corresponding network node is listening for incoming OTAC messages. In this regard, during a BEM→CBM occasion occurring at the time interval 402, network nodes BEM#1-BEM#7 may transmit their respective information messages to neighboring CBM network nodes. The CBM network nodes CBM#1-CBM#3 may not transmit any OTAC messages so that they may receive information messages sent by the BEM network nodes. At a subsequent CBM→BEM occasion during time interval 404 occurring k subframes following time interval 402, CBM#1-CBM#3 may transmit collective information message packages to their respective neighboring BEM network nodes. The BEM network nodes BEM#1-BEM#7 may not transmit any OTAC messages so that they may receive collective information message packages sent by the CBM network nodes. If a collective information message package requires an additional time interval, an extension may occur I subframes following time interval 404, at time interval 406. During time interval 406, one or more of CBM#1-CBM#3 may transmit a subsequent portion of a collective information message package while one or more of BEM#1-BEM#7 may not transmit any OTAC messages to enable receipt of the subsequent portion of the collective information message package.

According to at least some embodiments of the invention, a network node is configured to synchronize (e.g., through long OTAC) with other network nodes in the same network neighborhood cluster. Accordingly, network nodes 102 in a neighborhood cluster, such as the system of FIG. 3 may be time synchronized. Network nodes 102 in the same neighborhood cluster may then have synchronized BEM→CBM and CBM→BEM occasions. BEM→CBM and/or CBM→BEM occasions may then be scheduled to occur periodically.

The communications coordination unit 118 of a BEM network node is, in some embodiments, configured to determine (e.g., based at least in part upon the network node ID field of the information message) for an extracted information message included in a received collective information message whether the information message is related to a network node neighboring the BEM network node. For example, the communications coordination unit 118 may be configured to look up the identity of a network node to which a respective information message is related in a network node neighbor list to determine if the network node to which the respective information message is related is a neighboring network node. In this regard, a collective information message package may include an information message for a network node that does not neighbor a receiving BEM network node. For example, with reference to FIG. 3, the collective information message package generated by CBM#2 and received by BEM#6 may include an information message related to BEM#7, which does not directly neighbor BEM#6. Accordingly, the communications coordination unit 118 may be configured to discard information messages that are not related to a neighboring network node. Furthermore, since BEM network nodes may have more than one neighboring CBM network node, a BEM network node may receive multiple copies of the same information message and thus the communications coordination unit 118 of a BEM network node may be configured to discard a duplicative information message extracted from a collective information message package.

In embodiments wherein received collective information message packages include control information to facilitate combining and/or discarding redundant information messages, the communications coordination unit 118 of a BEM network node may be configured to combine redundant versions of received information messages based at least in part upon control information included in received collective information message packages. In this regard, the communications coordination unit 118 may be configured to utilize control information to facilitate implementation of hybrid automatic repeat request (HARQ)-like operations. The communications coordination unit 118 of a BEM network node may be configured to negotiate and/or otherwise coordinate with neighboring CBM network nodes what control information (e.g., redundancy version, radio resources, and/or the like) to use to facilitate combining redundant information messages at the receiving BEM network node.

The message coordination unit 118 of a BEM network node may also be configured to determine whether a collective information message package received from a CBM network node includes an accurate reflection of the information message transmitted by the BEM network node to the CBM network node during the previous BEM→CBM occasion. In this regard, the collective information message package may include an accurate reflection of the information message if, for example, the collective information message package comprises an exact copy of the information message or if the collective information message package comprises an information message related to the BEM network node including the message information contents of the information message originally transmitted to the CBM network node. In this regard, a BEM network node may verify whether a neighboring CBM network node received its intended information message transmitted during a previous BEM→CBM occasion. If an accurate reflection of the information message is not included in the collective information message package, the communications coordination unit 118 of the BEM network node may be configured to retransmit the information message to the CBM network node, such as during a subsequent BEM→CBM occasion.

To enhance reliability of OTAC, the communications coordination unit 118 may be configured to apply repetition for communicating a particular information message type, taking the urgency-and-importance characteristics of the information message type into consideration. For example, a repetition of coordinated BEM→CBM and CBM→BEM occasions may happen at the middle of the updating cycle of a particular information message type. Because individual BEM network nodes may be able to verify the success of a previous information message transmission as described above, the communications coordination unit 118 of a BEM network node may be configured to determine whether repetition is needed or not. The communications coordination unit 118 of a CBM network node may be configured to carry out the repetition using the most recently received information message(s).

The communications coordination unit 118 is configured in some embodiments to determine when a long OTAC period is necessary, such as for resynchronizing and/or reconfiguring a network node 102. For example, the communications coordination unit 118 of a BEM network node may be configured to engage in a long OTAC period based at least in part upon a determination of whether a received collective information message package includes an accurate reflection of a previously transmitted information message. If erroneous transmission and/or reception for the information message is detected for a predefined time interval (e.g., for a predefined number of consecutive BEM→CBM and/or CBM→BEM occasions), the communications coordination unit 118 may be configured to engage in a long OTAC period. Accordingly, in some embodiments of the invention, long OTAC may be triggered based at least in part upon monitoring short OTAC performance at an individual network node 102.

Figure 5:
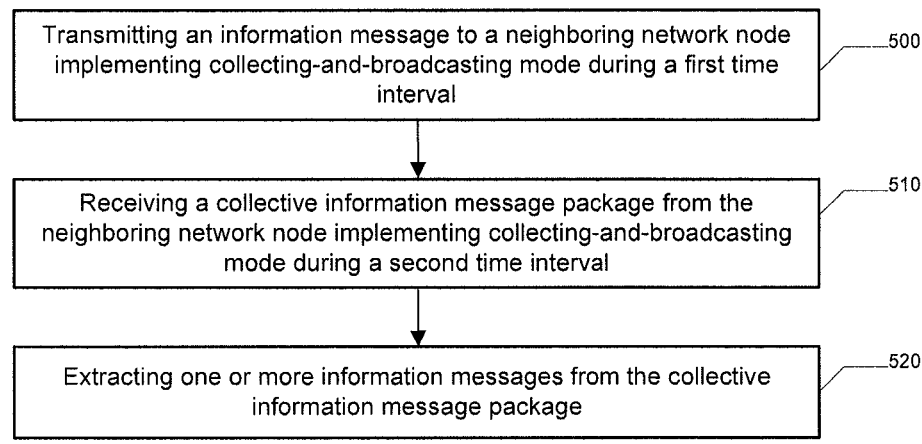
FIGS. 5-6 illustrate flowcharts according to exemplary methods for coordinating communications between network nodes according to exemplary embodiments of the present invention.
Figure 6:
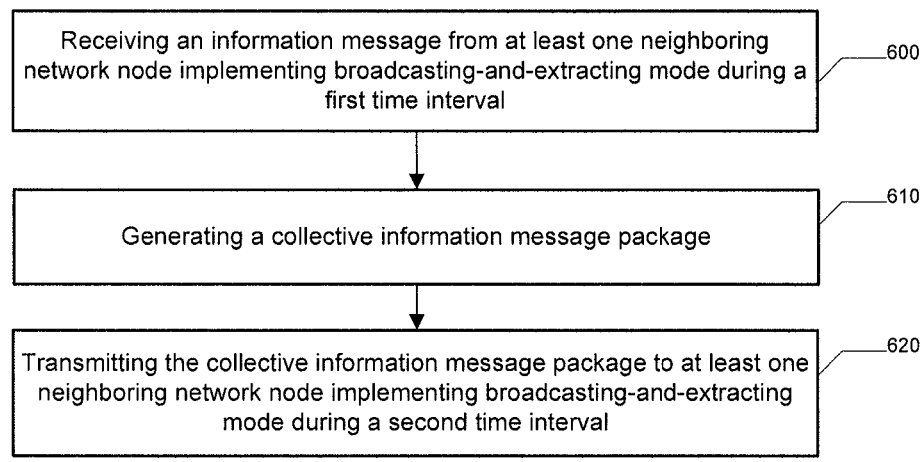

FIGS. 5-6 are flowcharts of a system, method, and computer program product according to exemplary embodiments of the invention. It will be understood that each block or step of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device and executed by a processor in the computing device. In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the instructions of the computer program product which execute on the computer or other programmable apparatus create means for implementing the functions specified in the flowchart block(s) or step(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture including instruction means which implement the function specified in the flowchart block(s) or step(s). The computer program instructions of one or more computer program products may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

FIG. 5 illustrates a flowchart according to an exemplary method for coordinating communications between network nodes according to an exemplary embodiment of the present invention. In this regard, FIG. 5 illustrates operations that may occur at network node 102 implementing BEM. Operation 500 may comprise the communications coordination unit 118 transmitting an information message related to the BEM network node to a neighboring network node 102 implementing CBM at a first time interval. The communications coordination unit 118 may then receive a collective information message package from the neighboring network node 102 implementing CBM at a second time interval, at operation 510. Operation 520 may comprise the communications coordination unit 118 extracting one or more information messages from the collective information message package.

FIG. 6 illustrates a flowchart according to an exemplary method for coordinating communications between network nodes according to an exemplary embodiment of the present invention. In this regard, FIG. 6 illustrates operations that may occur at network node 102 implementing CBM. The method may include the communications coordination unit 118 receiving an information message from at least one network node 102 implementing BEM during a first time interval, at operation 600. Operation 610 may comprise the communications coordination unit 118 generating a collective information package. The communications coordination unit 118 may then transmit the collective information message package to at least one neighboring network node 102 implementing BEM during a second time interval.

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, may be implemented by special purpose hardware-based computer systems which perform the specified functions or steps, or combinations of special purpose hardware and computer program product(s).

The above described functions may be carried out in many ways. For example, any suitable means for carrying out each of the functions described above may be employed to carry out embodiments of the invention. In one embodiment, a suitably configured processor may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

As such, then, some embodiments of the invention provide several advantages to computing devices and network service providers. Embodiments of the invention define a protocol defining when a network node is allowed to send OTAC messages and when a network node must be in discontinued transmission (DTX) so that it may receive an incoming OTAC message. Accordingly, embodiments of the invention provide for contention-free transmission and receipt of information messages by network nodes within a neighborhood such that a network node may learn the state of its neighboring network nodes.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
  determining, at a first network node, whether neighboring network nodes are implementing broadcasting-and-extracting mode or collecting-and-broadcasting mode;
  in response to determining that at least one neighboring network node is implementing collecting-and-broadcasting mode, implementing broadcasting-and-extracting mode at the first network node, wherein implementing broadcasting-and-extracting mode comprises:
    transmitting an information message related to the first network node to at least one neighboring network node implementing collecting-and-broadcasting mode during a first time interval;
  receiving a collective information message package from the at least one neighboring network node implementing collecting-and-broadcasting mode during a second time interval, wherein the collective information message package comprises:
    one or more information messages received by the neighboring network node implementing collecting-and-broadcasting mode from one or more network nodes during the first time interval and an information message related to the neighboring network node implementing collecting-and-broadcasting mode; and
    an indication, for each information message in the collective information message package, of an identity of a network node to which a respective information message is related;
  determining for an information message included in the collective information message package whether a network node to which the information message is related neighbors the first network node based at least in part upon an indicated identity of the network node included in the collective information message package;

discarding the information message when the network node to which the information message is related does not neighbor the first network node;

in response to determining that no neighboring network nodes are implementing collecting-and-broadcasting mode, implementing collecting-and-broadcasting mode at the first network node, wherein implementing collecting-and-broadcasting mode comprises:

receiving an information message from at least one neighboring network node implementing broadcasting-and-extracting mode during the first time interval;

generating a collective information message package comprising:

one or more information messages received from other network nodes and an information message related to the first network node; and an indication, for each information message in the collective information message package, of an identity of a network node to which a respective information message is related; and transmitting the collective information message package to at least one neighboring network node implementing broadcasting-and-extracting mode during the second time interval.

2. The method of claim 1, wherein the second time interval is scheduled to occur a predefined number of subframes following the first time interval.

3. The method of claim 1, wherein a time interval required to transmit the collective information message package exceeds the second time interval, and wherein:

implementing broadcasting-and-extracting mode further comprises:

receiving a first portion of the collective information message package during the second time interval, wherein the first portion of the collective information message package comprises an extension flag indicating that transmission of the collective information message package will be continued over a third time interval scheduled to occur a predefined number of subframes following the second time interval; and receiving a second portion of the collective information message package from the neighboring network node implementing collecting-and-broadcasting mode during the third time interval; and implementing collecting-and-broadcasting mode further comprises:

transmitting a first portion of the collective information message package to at least one neighboring network node implementing broadcasting-and-extracting mode, wherein the first portion of the collective information message package comprises an extension flag indicating that transmission of the collective information message package will be continued over a third time interval scheduled to occur a defined number of subframes following the second time interval; and transmitting a second portion of the collective information message package to the at least one neighboring network node implementing broadcasting-and-extracting mode during the third time interval.

4. The method of claim 1, wherein implementing broadcasting-and-extracting mode further comprises:

determining whether the collective information message package includes an accurate reflection of the information message transmitted to the neighboring network node during the first time interval; and retransmitting the information message to the neighboring network node or engaging in a long over-the-air communication period to resynchronize and reconfigure the first network node when the collective information message package is determined not to include an accurate reflection of the information message.

5. The method of claim 1:

wherein when the first network node implements broadcasting-and-extracting mode, transmitting an information message comprises transmitting an over-the-air communication, and receiving a collective information message comprises receiving an over-the-air communication; and wherein when the first network node implements collecting-and-broadcasting mode, receiving an information message comprises receiving an over-the-air communication, and transmitting the collective information message package comprises transmitting an over-the-air communication.

6. The method of claim 1, wherein the first network node comprises an evolved Node B configured to operate based at least in part upon Long Term Evolution mobile communications standards.

7. The method of claim 1, wherein implementing broadcasting-and-extracting mode further comprises:

receiving a second collective information message package from a second neighboring network node implementing collecting-and-broadcasting mode during the second time interval; and utilizing control information included in one or more of the received collective information message packages to combine one or more portions of the received collective information message packages; and wherein when implementing collecting-and-broadcasting mode, generating the collective information message package comprises generating a collective information message package comprising control information to enable a network node implementing broadcasting-and-extracting mode to combine received collective information message packages.

8. A computer program product embodied on a non-transitory computer-readable medium in which a computer program is stored that when executed by a computer provides instructions to control or carry out:

determining, at a first network node, whether neighboring network nodes are implementing broadcasting-and-extracting mode or collecting-and-broadcasting mode;

in response to determining that at least one neighboring network node is implementing collecting-and-broadcasting mode, implementing broadcasting-and-extracting mode at the first network node, wherein when implementing broadcasting-and-extracting mode, the computer program product further provides instructions for:

causing an information message related to the first network node at least one neighboring network node implementing collecting-and-broadcasting mode to be transmitted during a first time interval;

causing a collective information message package to be received from the at least one neighboring network node implementing collecting-and-broadcasting mode during a second time interval, wherein the collective information message package comprises:

one or more information messages received by the neighboring network node implementing collecting-and-broadcasting mode from one or more network nodes during the first time interval and an information message related to the neighboring network node implementing collecting-and-broadcasting mode, and an indication, for each information message in the collective information message package, of an identity of a network node to which a respective information message is related;

determining for an information message included in the collective information message package whether a network node to which the information message is related neighbors the first network node based at least in part upon an indicated identity of the network node included in the collective information message package;

discarding the information message when the network node to which the information message is related does not neighbor the first network node;

in response to determining that no neighboring network nodes are implementing collecting-and-broadcasting mode, implementing collecting-and-broadcasting mode at the first network node, wherein when implementing collecting-and-broadcasting mode, the computer program product further provides instructions for:

causing an information message from at least one neighboring network node implementing broadcasting-and-extracting mode to be received during the first time interval;

generating a collective information message package comprising:

one or more information messages received from other network nodes and an information message related to the first network node; and an indication, for each information message in the collective information message package, of an identity of a network node to which a respective information message is related; and causing the collective information message package to be transmitted to at least one neighboring network node implementing broadcasting-and-extracting mode during the second time interval.

9. The computer program product of claim 8, wherein the second time interval is scheduled to occur a predefined number of subframes following the first time interval.

10. The computer program product of claim 8, wherein a time interval required to transmit the collective information message package exceeds the second time interval, and wherein:

when implementing broadcasting-and-extracting mode, the computer program product further provides instructions for:

causing a first portion of the collective information message package to be received during the second time interval, wherein the first portion of the collective information message package comprises an extension flag indicating that transmission of the collective information message package will be continued over a third time interval scheduled to occur a predefined number of subframes following the second time interval; and causing a second portion of the collective information message package to be received from the neighboring network node implementing collecting-and-broadcasting mode during the third time interval; and when implementing collecting-and-broadcasting mode, the computer program product further provides instructions for:

causing a first portion of the collective information message package to be transmitted to at least one neighboring network node implementing broadcasting-and-extracting mode, wherein the first portion of the collective information message package comprises an extension flag indicating that transmission of the collective information message package will be continued over a third time interval scheduled to occur a defined number of subframes following the second time interval; and causing a second portion of the collective information message package to be transmitted to the at least one neighboring network node implementing broadcasting-and-extracting mode during the third time interval.

11. The computer program product of claim 8, wherein when implementing broadcasting-and-extracting mode, the computer program product further provides instructions for:

determining whether the collective information message package includes an accurate reflection of the information message transmitted to the neighboring network node during the first time interval; and causing the information message to be retransmitted to the neighboring network node or engaging in a long over-the-air communication period to resynchronize and reconfigure the first network node when the collective information message package is determined not to include an accurate reflection of the information message.

12. The computer program product of claim 8:

wherein when implementing broadcasting-and-extracting mode, the instructions for causing an information message to be transmitted comprise instructions for causing an over-the-air communication to be transmitted, and the instructions for causing a collective information message to be received comprise instructions for causing an over-the-air communication to be received; and wherein when implementing collecting-and-broadcasting mode, the instructions for causing an information message to be received comprise instructions for causing an over-the-air communication to be received, and the instructions for causing the collective information message package to be transmitted comprise instructions for causing an over-the-air communication to be transmitted.

13. The computer program product of claim 8, wherein the first network node comprises an evolved Node B configured to operate based at least in part upon Long Term Evolution mobile communications standards.

14. An apparatus comprising at least one processor and at least one memory including computer program code storing instructions that when executed by the processor cause the apparatus to at least:

determine whether neighboring network nodes are implementing broadcasting-and-extracting mode or collecting-and-broadcasting mode;

in response to a determination that at least one neighboring network node is implementing collecting-and-broadcasting mode, implement broadcasting-and-extracting mode, wherein when implementing broadcasting-and-extracting mode, the instructions when executed by the processor cause the apparatus to at least:

transmit an information message related to the apparatus to at least one neighboring network node implementing collecting-and-broadcasting mode during a first time interval;

receive a collective information message package from the at least one neighboring network node implementing collecting-and-broadcasting mode during a second time interval, wherein the collective information message package comprises:
    one or more information messages received by the neighboring network node implementing collecting-and-broadcasting mode from one or more network nodes during the first time interval and an information message related to the neighboring network node implementing collecting-and-broadcasting mode, and
    an indication, for each information message in the collective information message package, of an identity of a network node to which a respective information message is related;
determine for an information message included in the collective information message package whether a network node to which the information message is related neighbors the apparatus based at least in part upon an indicated identity of the network node included in the collective information message package; and
discard the information message when the network node to which the information message is related does not neighbor the apparatus;
in response to a determination that no neighboring network nodes are implementing collecting-and-broadcasting mode, implement collecting-and-broadcasting mode, wherein when implementing collecting-and-broadcasting mode, the instructions when executed by the processor cause the apparatus to at least:
    receive an information message from at least one neighboring network node implementing broadcasting-and-extracting mode during the first time interval;
    generate a collective information message package comprising:
        one or more information messages received from other network nodes and an information message related to the apparatus; and
        an indication, for each information message in the collective information message package, of an identity of a network node to which a respective information message is related; and
    transmit the collective information message package to at least one neighboring network node implementing broadcasting-and-extracting mode during the second time interval.

15. The apparatus of claim 14, wherein the second time interval is scheduled to occur a predefined number of subframes following the first time interval.

16. The apparatus of claim 14, wherein a time interval required to transmit the collective information message package exceeds the second time interval, and wherein:
when implementing broadcasting-and-extracting mode, the instructions when executed further cause the apparatus to:
    receive a first portion of the collective information message package during the second time interval, wherein the first portion of the collective information message package comprises an extension flag indicating that transmission of the collective information message package will be continued over a third time interval scheduled to occur a predefined number of subframes following the second time interval; and
    receive a second portion of the collective information message package from the neighboring network node implementing collecting-and-broadcasting mode during the third time interval; and
when implementing collecting-and-broadcasting mode, the instructions when executed further cause the apparatus to:
    transmit a first portion of the collective information message package to at least one neighboring network node implementing broadcasting-and-extracting mode, wherein the first portion of the collective information message package comprises an extension flag indicating that transmission of the collective information message package will be continued over a third time interval scheduled to occur a defined number of subframes following the second time interval; and
    transmit a second portion of the collective information message package to the at least one neighboring network node implementing broadcasting-and-extracting mode during the third time interval.

17. The apparatus of claim 14, wherein when implementing broadcasting-and-extracting mode, the instructions when executed by the processor further cause the apparatus to:
    determine whether the collective information message package includes an accurate reflection of the information message transmitted to the neighboring network node during the first time interval; and
    retransmit the information message to the neighboring network node or engage in a long over-the-air communication period to resynchronize and reconfigure the apparatus when the collective information message package is determined not to include an accurate reflection of the information message.

18. The apparatus of claim 14:
wherein when implementing broadcasting-and-extracting mode, the instructions when executed by the processor cause the apparatus to transmit an information message by transmitting an over-the-air communication, and to receive a collective information message by receiving an over-the-air communication; and
wherein when implementing collecting-and-broadcasting mode, the instructions when executed by the processor cause the apparatus to receive an information message by receiving an over-the-air communication, and to transmit the collective information message package by transmitting an over-the-air communication.

19. The apparatus of claim 14, wherein the apparatus comprises an evolved Node B configured to operate based at least in part upon Long Term Evolution mobile communications standards.

20. An apparatus comprising:
means for determining, at a first network node, whether neighboring network nodes are implementing broadcasting-and-extracting mode or collecting-and-broadcasting mode;
means for implementing broadcasting-and-extracting mode at the first network node in response to determining that at least one neighboring network node is implementing collecting-and-broadcasting mode, wherein the means for implementing broadcasting-and-extracting mode further comprises:
    means for transmitting an information message related to the first network node to at least one neighboring network node implementing collecting-and-broadcasting mode during a first time interval;
    means for receiving a collective information message package from the at least one neighboring network node implementing collecting-and-broadcasting mode during a second time interval, wherein the collective information message package comprises:
one or more information messages received by the neighboring network node implementing collecting-and-broadcasting mode from one or more network nodes during the first time interval and an information message related to the neighboring network node implementing collecting-and-broadcasting mode, and
an indication, for each information message in the collective information message package, of an identity of a network node to which a respective information message is related;
means for determining for an information message included in the collective information message package whether a network node to which the information message is related neighbors the first network node based at least in part upon an indicated identity of the network node included in the collective information message package;
means for discarding the information message when the network node to which the information message is related does not neighbor the first network node;
means for implementing collecting-and-broadcasting mode at the first network node in response to determining that no neighboring network nodes are implementing collecting-and-broadcasting mode, wherein the means for implementing collecting-and-broadcasting mode further comprises:
means for receiving an information message from at least one neighboring network node implementing broadcasting-and-extracting mode during the first time interval;
means for generating a collective information message package comprising comprising:
one or more information messages received from other network nodes and an information message related to the apparatus; and
an indication, for each information message in the collective information message package, of an identity of a network node to which a respective information message is related; and
means for transmitting the collective information message package to at least one neighboring network node implementing broadcasting-and-extracting mode during the second time interval.

21. A system comprising:
a first network node implementing collecting-and-broadcasting mode; and
one or more network nodes neighboring the first network node and implementing broadcasting-and-extracting mode;
wherein the first network node is configured to:
receive an information message from at least one of the one or more neighboring network nodes during a first time interval;
generate a collective information message package comprising:
information messages received from other network nodes and an information message related to the first network node; and
an indication, for each information message in the collective information message package, of an identity of a network node to which a respective information message is related;
determine for an information message included in the collective information message package whether a network node to which the information message is related neighbors the first network node based at least in part upon an indicated identity of the network node included in the collective information message package;
discard the information message when the network node to which the information message is related does not neighbor the first network node;
transmit the collective information message package to the one or more network nodes neighboring the first network node during a second time interval;
wherein the one or more network nodes neighboring the first network node are configured to:
transmit an information message to the first network node during the first time interval; and
receive the collective information message package from the first network node during the second time interval, wherein the collective information message package comprises an indication, for each information message in the collective information message package, of an identity of a network node to which a respective information message is related; and
wherein when the first network node implements collecting-and-broadcasting mode, no network node neighboring the first network node implements collecting-and-broadcasting mode.

* * * * *

UNITED STATES PATENT AND TRADEMARK OFFICE
CERTIFICATE OF CORRECTION

PATENT NO. : 9,320,034 B2  
APPLICATION NO. : 13/254490  
DATED : April 19, 2016  
INVENTOR(S) : Frank Frederiksen et al.

Page 1 of 1

It is certified that error appears in the above-identified patent and that said Letters Patent is hereby corrected as shown below:

In the Claims

In Claim 20:
Column 23, line 36, "comprising comprising" should be deleted and --comprising-- should be inserted.

Signed and Sealed this
Twenty-eighth Day of June, 2016

Michelle K. Lee
*Director of the United States Patent and Trademark Office*